United States Patent
Jahncke et al.

(10) Patent No.: US 12,496,640 B2
(45) Date of Patent: Dec. 16, 2025

(54) MULTI-PART MODULAR TOOL

(71) Applicant: Franken GmbH & Co. KG Fabrik für Präzisionswerkzeuge, Rückersdorf (DE)

(72) Inventors: Michael Jahncke, Freystadt (DE); Cornelius Müller, Schnaittach (DE); Hans-Jörg Licha, Fürth (DE)

(73) Assignee: FRANKEN GMBH & CO. KG FABRIK FÜR PRÄZISIONSWERKZEUGE, Rückersdorf (DE)

( * ) Notice: Subject to any disclaimer, the term of this patent is extended or adjusted under 35 U.S.C. 154(b) by 597 days.

(21) Appl. No.: 17/694,187

(22) Filed: Mar. 14, 2022

(65) Prior Publication Data
US 2022/0305566 A1 Sep. 29, 2022

(30) Foreign Application Priority Data

Mar. 15, 2021 (DE) ...................... 10 2021 106 246.2

(51) Int. Cl.
*B23C 5/22* (2006.01)
*B23B 27/14* (2006.01)
*B23B 51/00* (2006.01)

(52) U.S. Cl.
CPC .......... *B23B 27/14* (2013.01); *B23B 51/0004* (2022.01); *B23B 2231/365* (2013.01); *B23C 2210/02* (2013.01); *B23C 2250/12* (2013.01)

(58) Field of Classification Search
CPC ......... B23C 5/00; B23C 2210/02; B23C 5/28; B23C 2240/245; B23C 2240/24;
(Continued)

(56) References Cited

U.S. PATENT DOCUMENTS 6,394,711 B1 * 5/2002 Brosius ..................... B23C 5/10
                                                  408/239 R
2006/0008771 A1 * 1/2006 Courvoisier ....... A61B 17/1637
                                                       433/165
(Continued)

FOREIGN PATENT DOCUMENTS

CN          102458742 A  *  5/2012  ........... B23B 31/005
DE   112007003740 T5  *  11/2010  .............. B22F 7/062
(Continued)

OTHER PUBLICATIONS

English DE202013006089U1 Translation (Year: 2013).*
English DE112007003740T5 Translation (Year: 2010).*

*Primary Examiner* — Sara Addisu
(74) *Attorney, Agent, or Firm* — Workman Nydegger

(57) ABSTRACT

A multi-part modular tool rotatable about a longitudinal tool axis (A), comprising: a machining head; a first holding element comprising a body elongated along the longitudinal axis (A) of the tool, in which a passage extends along the longitudinal axis (A) of the tool; a second holding element which can extend in the passage of the first holding element; wherein the machining head can be connected to the second holding element in such a way that the machining head is fixed firmly to the first holding element at least in the axial direction (A) and/or in the radial direction (R), and wherein the passage of the first holding element and the second holding element are adapted to one another such that during a connection process in which the machining head is connected to the second holding element, the second holding element is movable relative to the first holding element.

19 Claims, 5 Drawing Sheets

(58) Field of Classification Search
CPC ............ B23C 2240/32; B23B 51/0004; B23B 51/0003; B23B 51/0002; B23B 51/06; B23B 2240/24; B23B 2251/02; B23B 2260/114; B23B 2231/365; B23D 2277/066
USPC .......................................................... 407/30
See application file for complete search history.

(56) References Cited

U.S. PATENT DOCUMENTS

| | | | | |
|---|---|---|---|---|
| 2008/0170917 | A1* | 7/2008 | Hilker | B23C 5/1054 407/54 |
| 2009/0010709 | A1* | 1/2009 | Berglow | B23C 5/10 408/233 |
| 2011/0211921 | A1* | 9/2011 | Volokh | B23C 5/10 408/239 R |
| 2016/0332241 | A1* | 11/2016 | Liu | B23C 5/10 |
| 2020/0147699 | A1* | 5/2020 | Chen | B23B 31/2012 |
| 2021/0062857 | A1* | 3/2021 | Lin | F16B 39/025 |
| 2021/0086275 | A1* | 3/2021 | Ueno | B23B 31/1179 |
| 2021/0370413 | A1* | 12/2021 | Chen | B23C 5/10 |
| 2021/0394285 | A1* | 12/2021 | Bojanowski | B22F 5/08 |

FOREIGN PATENT DOCUMENTS

| | | | | |
|---|---|---|---|---|
| DE | 202013006089 U1 * | 9/2013 | | B23C 5/10 |
| DE | 102017127814 A1 * | 5/2019 | | B23B 31/1122 |
| WO | WO-9813161 A1 * | 4/1998 | | B23B 31/11 |
| WO | WO-0130524 A1 * | 5/2001 | | B23B 27/164 |
| WO | WO-2008150219 A1 * | 12/2008 | | B23B 27/16 |
| WO | WO-2009005443 A1 * | 1/2009 | | B23B 31/11 |
| WO | WO-2013057778 A1 * | 4/2013 | | B23B 31/005 |
| WO | 2014/118264 | 8/2014 | | |
| WO | 2017/020051 | 2/2017 | | |
| WO | WO-2019174488 A1 * | 9/2019 | | B23B 29/12 |

* cited by examiner

MULTI-PART MODULAR TOOL

CROSS-REFERENCE TO RELATED APPLICATIONS

The present invention claims the benefit of priority to German Patent Application No. 10 2021 106 246.2, the entire content which is incorporated herein by reference.

BACKGROUND OF THE INVENTION

1. Field of the Invention

The present invention relates to a multi-part modular tool rotatable about a longitudinal tool axis.

2. The Relevant Technology

The publication WO 2014/118264 A1 describes a tool arrangement with a screw-in tool and an associated tool holder. The screw-in tool has a cylindrical tool head and a tool shank with an external thread. The tool holder belonging to the screw-in tool includes a receiving body, which comprises a hollow cylindrical receiving part designed as a threaded insert and a sleeve-shaped guide part detachably fastened to the receiving part. The hollow cylindrical receiving part contains a cylindrical section with two support areas spaced apart from one another in the axial direction, which are designed as externally threaded sections. Via these, the sleeve-shaped guide part provided with an internal thread is screwed onto the cylindrical section and supported. The receiving part has a receiving opening with the internal thread at one end and an internal hexagon at the other end. The guide part has two guide surfaces for precise positioning of the screw-in tool.

WO 2017/020051 A1 discloses a replaceable cutting head having a working area and a connecting portion formed integrally with the working area and having an external thread. A support surface is formed between the working area and the external thread for support on a corresponding contact surface of a tool shank. The support surface is curved in a section of a plane containing the longitudinal axis of the cutting head.

BRIEF SUMMARY OF THE INVENTION

It is an objective of the invention to provide an advantageous multi-part modular tool.

The objective is solved according to the invention by a multi-part, modular tool rotatable about a longitudinal tool axis, comprising: a machining head; a first holding element having an elongated body along the longitudinal axis of the tool, with a passageway extending in the body along the longitudinal axis of the tool; a second holding element which can or does extend at least in sections in the passage of the first holding element; wherein the machining head is connectable or connected to the second holding element such that the machining head is fixedly secured to the first holding element at least in the axial direction and/or in the radial direction, and wherein the passage of the first holding element and the second holding element are adapted to each other such that during a connecting operation in which the machining head is connected to the second holding element the second holding element is movable or moved relative to the first holding element.

Such a modular tool provides a tool shank that can be connected to interchangeable machining heads. For this purpose, the machining head is detachably connected to the second holding element and thereby fixed to the first holding element. The second holding element is movable within the first holding element relative to the latter and is therefore mounted in a floating manner. As a result, when the machining head is connected to the holding elements, no transverse forces are generated that would negatively affect the concentricity properties of the tool. In addition, an axial offset of the first holding element relative to the second holding element can be compensated. In addition, when the tool is clamped in a chuck, clamping forces only act on the outer first holding element, which serves as the tool shank, but not on the inner second holding element, since the floating bearing decouples the second holding element from the radial and/or axial clamping forces.

In an advantageous embodiment of the invention, the first holding element has a front end portion and a rear end portion arranged opposite to the front end portion, and the second holding element has a front end portion and a rear end portion arranged opposite to the front end portion. Alternatively or additionally, the rear end portion of the second holding element may be receivable or received within the rear end portion of the first holding element. Further alternatively or additionally, the front end portion of the second holding element may extend into or through the front end portion of the first holding element, in particular projecting axially therefrom.

In this embodiment, the machining head can be connected to the front end portion of the second holding element so that the machining head is drawn into contact with the front end portion of the first holding element and fixed thereto. Due to the floating bearing, the second holding element can be tilted at an angle to the longitudinal axis of the tool and can thus compensate for movements during the connection process.

A further advantageous embodiment of the invention comprises that the rear end portion of the second holding element is substantially fixed relative to the rear end portion of the first holding element during a connecting operation in which the machining head is connected to the second holding element, in particular in at least one axial direction. Alternatively or additionally, the front end portion of the second holding element may be movable or moved relative to the front end portion of the first holding element during a connection operation in which the machining head is connected to the second holding element, in particular in a radial direction.

In this way, the machining head can be pulled into its correct working position relative to the longitudinal axis of the tool during the connecting process, whereby relatively wide tolerances can be compensated for by the movability of the second holding element relative to the first holding element.

Furthermore, it may be advantageous that the rear end portion of the second holding element is secured or can be secured within the rear end portion of the first holding element, in particular by a fixing element, preferably an elastic fixing element, in particular such that the rear end portion of the second holding element is arranged concentrically to the rear end portion of the first holding element.

In this way, the second holding element is secured against falling out of the first holding element. Furthermore, an elastic fixing element in particular allows at least slight radial and/or axial movement of the rear end region of the second holding element within the rear end region of the first holding element, at least during the connection process.

Alternatively or additionally, it may be provided that the front end portion of the second holding element extends in or through the front end portion of the first holding element such that it can move, in particular radially, relative to the front end portion of the first holding element during the connection process in which the machining head is connected to the second holding element.

This allows the machining head to be pulled to its correct working position relative to the longitudinal axis of the tool and to the first holding element during the connecting process. In particular, relatively wide tolerances on the machining head, for example tolerances required by a sintered thread of the machining head can be compensated in this way.

Another advantageous embodiment comprises that the front end portion of the second holding element is arranged substantially concentrically to the front end portion of the first holding element when the machining head is connected to the second holding element, in particular after the end of the connection process, in such a way that the machining head is fixedly attached to the first holding element.

In this way, a high concentricity of the tool can be achieved. It also ensures that the machining head rests securely against the first holding element.

Furthermore, it may be advantageous that the front end portion of the second holding element is spaced from the front end portion of the first holding element, in particular such that a circumferential gap is provided between the front end portion of the second holding element and the front end portion of the first holding element.

Such a distance between the first and second holding elements prevents the transmission of clamping forces from the chuck or clamping fixture to the second holding element on the inside. In addition, the generation of transverse forces is also reduced or completely avoided.

Moreover it may be advantageous that the machining head comprises a cavity provided to receive a leading end portion of the second holding element and wherein the machining head comprises an internal thread disposed within the cavity which is screwable or screwed onto an external thread provided on the leading end portion.

The machining head can thus be screwed onto the second holding element manually in a simple manner and tightened with a conventional torque wrench. Due to the advantageous design, only a relatively low tightening torque is required. The machining head can also be screwed on and off while the tool is clamped in a chuck. It is not necessary to remove the tool as a whole from the chuck to change the machining head.

Advantageously, the machining head may also have a first interface surface and/or a second interface surface and wherein a front end portion of the first holding element has a further interface surface and/or a second interface surface,
  wherein the first interface surface of the machining head cooperates with the first interface surface of the front end portion during a connecting operation in which the machining head is connected to the second holding member such that the machining head is self-centeredly moved into a concentric position with the first holding member. Alternatively or additionally, the second interface surface may cooperate with the second interface surface of the front end portion such that the machining head is supported, in particular completely circumferentially, radially on the front end portion.

Thus, force transmission in axial and radial direction via the interface surfaces from the machining head to the first holding element is secured. It is possible to provide large effective interface surfaces.

It is particularly advantageous if the first interface surface of the machining head and the first interface surface of the front end region are designed as lateral surfaces of a truncated cone, in particular such that the first interface surface of the machining head and/or the first interface surface of the front end region are inclined at an angle in the range of 30° to 60°, in particular in the range of 40° to 50°, preferably of 45°, to the longitudinal axis of the tool.

When the machining head is screwed to the second retaining element, the frustoconical lateral surfaces allow the second retaining element to be self-centered relative to the first retaining element or, in other words, allow the second retaining element to become automatically concentric with respect to the first retaining element.

Furthermore, an embodiment is advantageous in which the second interface surface of the machining head is an outer surface of the machining head and is arranged in the passage of the first holding element, wherein the second interface surface of the front end region is an inner wall surface of the passage and that the second interface surface of the machining head is arranged between the inner wall surface and the second holding element.

The dimensioning and the tolerance of the second interface surfaces can be adapted to each other in such a way that a fit, for example a clearance fit, is formed for the transmission of force in the radial direction, which permits a low-resistance screwing-in of the machining head and at the same time ensures a tight fit of the machining head in the radial direction.

A further advantageous embodiment comprises that the rear end region of the second holding element and/or the rear end region of the first holding element has or have an anti-rotation device that prevents rotation of the first holding element relative to the second holding element, in particular in at least one screw-in direction, preferably in both directions of rotation of the tool, in particular wherein the rear end region of the first holding element and the rear end region of the second holding element have at least one or more surfaces that act positively against one another. For this purpose, the anti-rotation device can comprise positively acting surfaces on the rear end region and/or the rear end region, which prevent or can prevent rotation of the first holding element relative to the second holding element.

The anti-rotation device allows the machining head to be screwed onto the second holding element without the second holding element having to be fixed in addition to the first holding element. In addition, a torque acting on the first holding element is transmitted via the anti-rotation device to the second holding element and from the latter in particular via the screw connection to the machining head, so that an advantageous torque transmission is provided.

Advantageous may further be embodiments in which the first holding element comprises a hard metal material, in particular consists entirely of hard metal. Alternatively, the first holding element may comprise a heavy metal, in particular consist entirely of heavy metal. Furthermore, the first holding element may alternatively comprise a steel, in particular consist entirely of a steel.

Alternatively or additionally, the second holding element may comprise a carbide-free material, preferably a tool steel or a high-speed steel, in particular being made entirely of a carbide-free material. Further alternatively or additionally, the machining head may comprise a carbide material, in particular wherein the machining head comprises a sintered thread, preferably an internal thread disposed within a cavity of the machining head and sintered to or with the machining head.

In this way, a tool can be provided that offers all the advantages of a carbide tool, whereby carbide material can be saved in a resource-efficient manner compared to tools made entirely of carbide. In addition, the floating bearing of the second holding element is particularly advantageous to compensate for the relatively coarse tolerance of the sintered internal thread.

In another advantageous embodiment, the machining head may be a milling head, a reaming tool, a twist drill head, a thread milling head, a tapping head, or a thread former.

Thus, a flexible modular tool is already provided, which can be used with different machining heads.

Advantageous embodiments and further developments according to the invention result from the respective dependent patent claims and also from the following description.

BRIEF DESCRIPTION OF THE DRAWINGS

The invention is further explained below by means of embodiment examples with reference to the drawings. It shows in each case in a schematic representation.

Parts and sizes corresponding to each other are marked with same reference signs in FIG. 1 to FIG. 7.

DETAILED DESCRIPTION OF THE INVENTION

Figure 1:
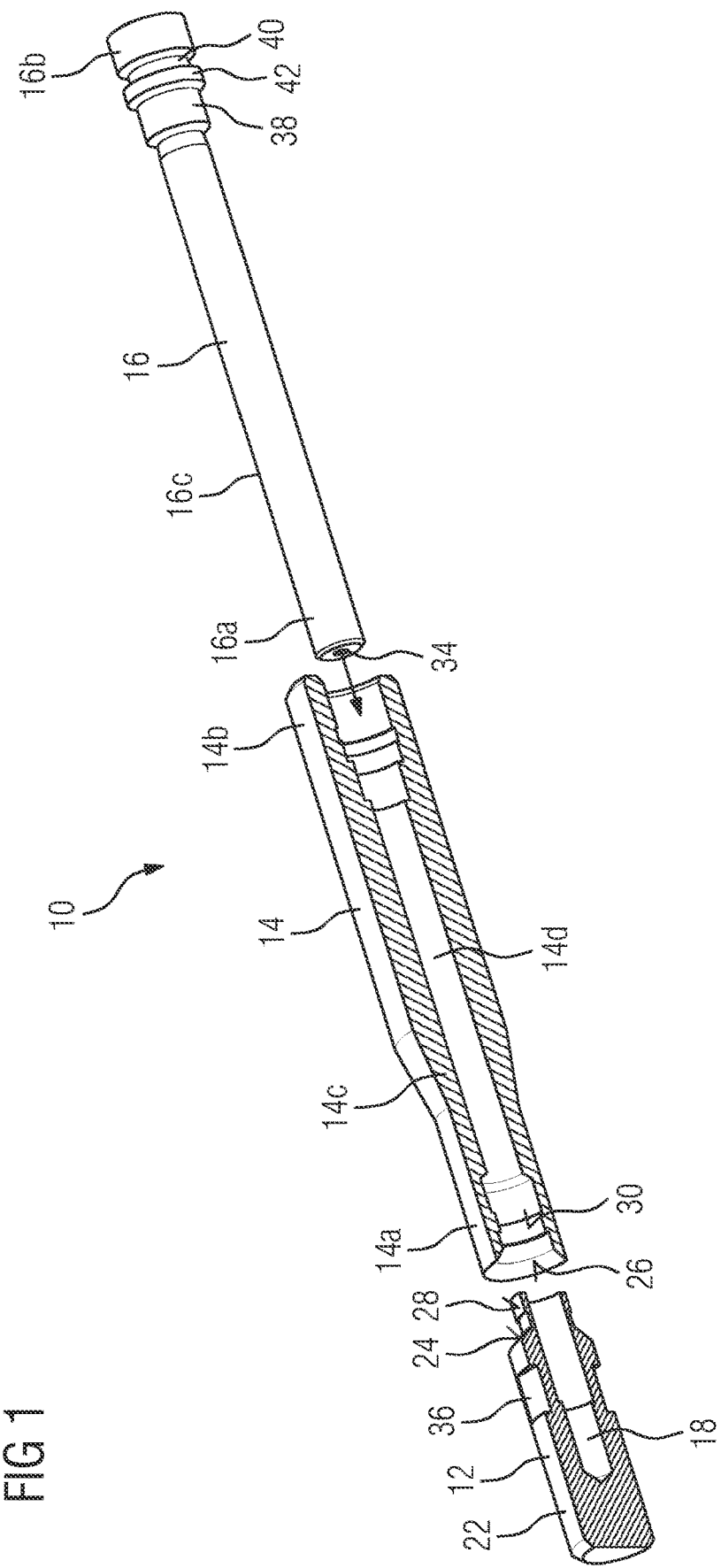
FIG. 1 shows a perspective exploded cross-sectional view of a multi-part modular tool according to the invention.
Figure 2:
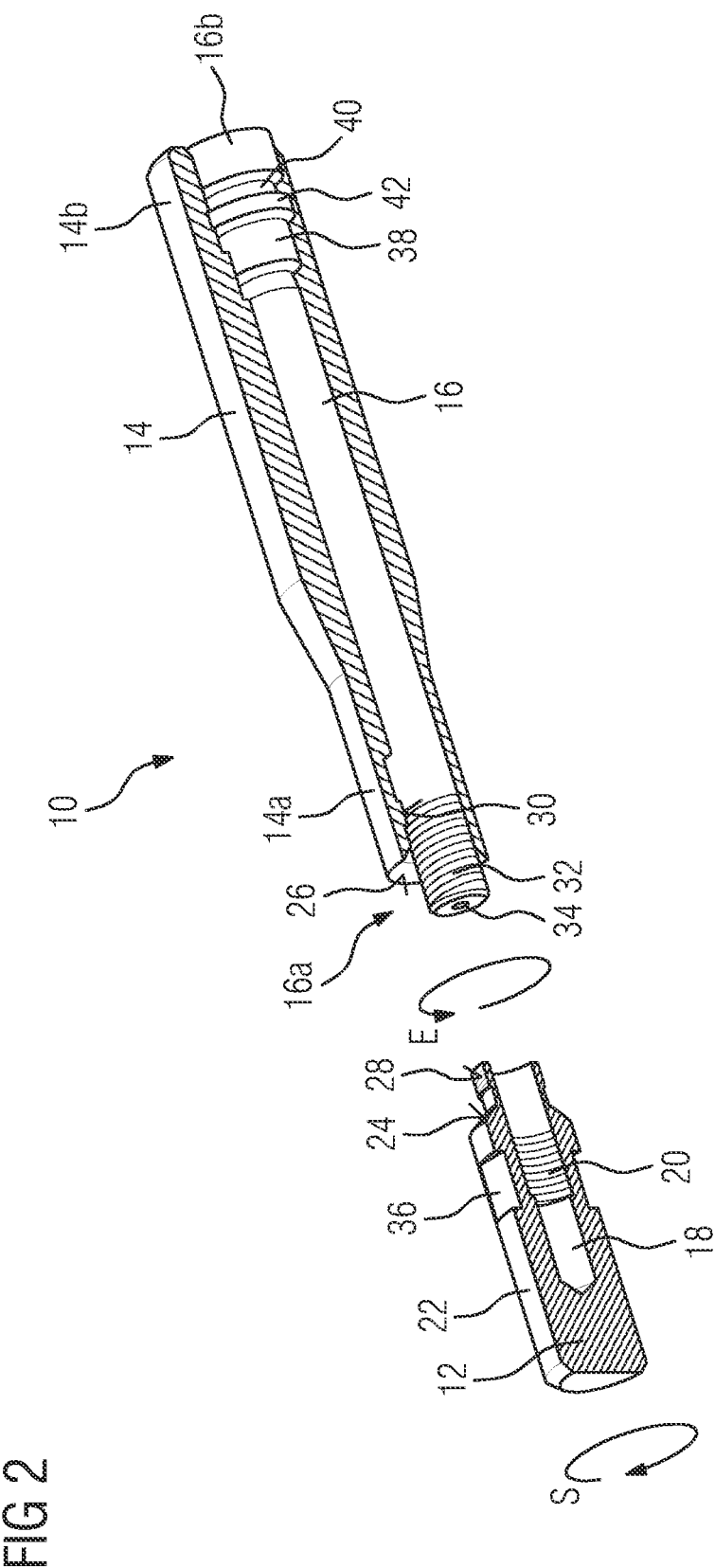
FIG. 2 shows a perspective exploded cross-sectional view with the first and second holding elements assembled together and the machining head of a tool according to the invention not yet assembled.

FIG. 1 and FIG. 2 show a multi-part modular tool 10 having a first holding element 14, a second holding element 16, and a machining head 12. The first holding element 14 is formed as an elongated sleeve having a front end portion 14a, a rear end portion 14b, and an intermediate central portion 14c. The first holding element 14 also includes a passageway 14d in the form of a central through bore along the longitudinal axis of the holding element 14. The longitudinal axis of the holding element 14 coincides with the longitudinal tool axis A when the tool 10 is fully assembled.

The second holding element 16 has a front end portion 16a, a rear end portion 16b, and an intermediate portion 16c therebetween, and is configured as a substantially elongated bolt. The rear end portion 16b has a larger diameter than the front end portion 16a.

The second holding element 16 can be inserted into the first holding element 14 during assembly of the tool 10, the direction of insertion is marked with an arrow and is along the longitudinal axis A of the tool.

In this regard, the passageway 14d is sized to allow the second holding element 16 to be inserted or pushed into the passageway 14d so that the rear end portion 16b is fully seated within the rear end portion 14b, as shown in FIG. 2.

Furthermore, the tool 10 comprises a machining head 16 that can be screwed to the second holding element 16 in a screwing-in direction E. Preferably, the screwing-in direction E is opposite to a working direction of rotation S of the machining head 16, whereby an unintentional loosening of the machining head 16 from the second holding element 16 during a rotation of the tool 10 in the direction of the working direction of rotation S is prevented.

FIG. 2 shows the second holding element 16 in a received state in the passage 14d. The machining head 12 can be connected to the front end portion 16a of the second holding element 16 by screwing it on.

Figure 3:
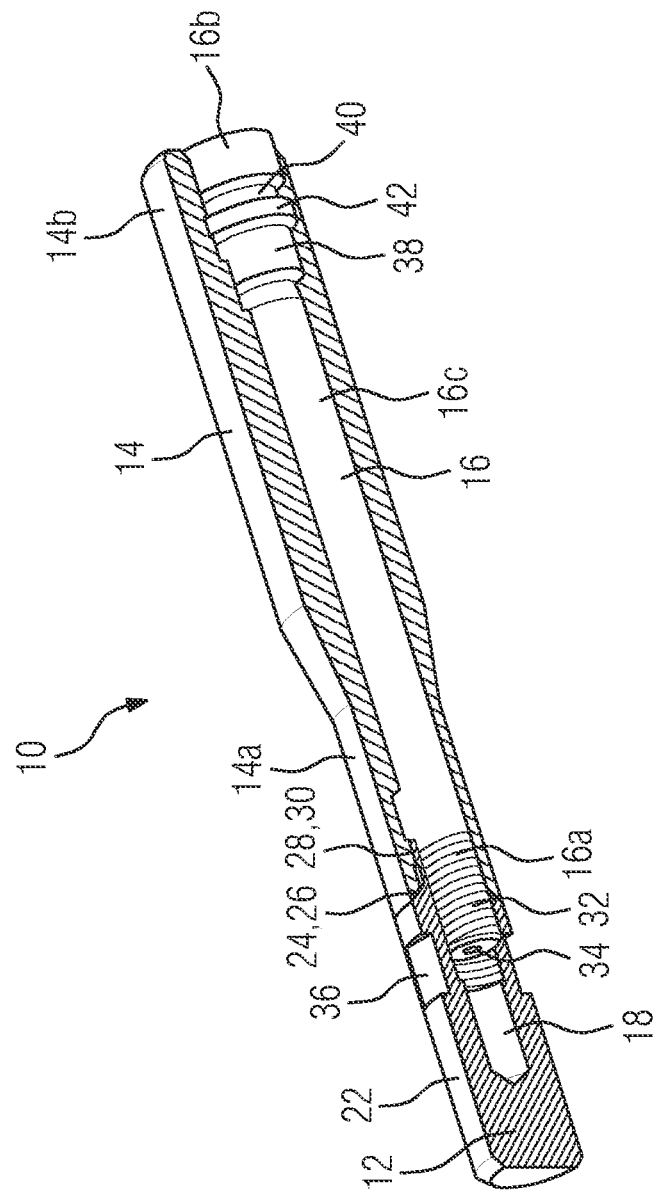
FIG. 3 shows a perspective sectional view of a tool according to the invention in assembled condition.
Figure 4:
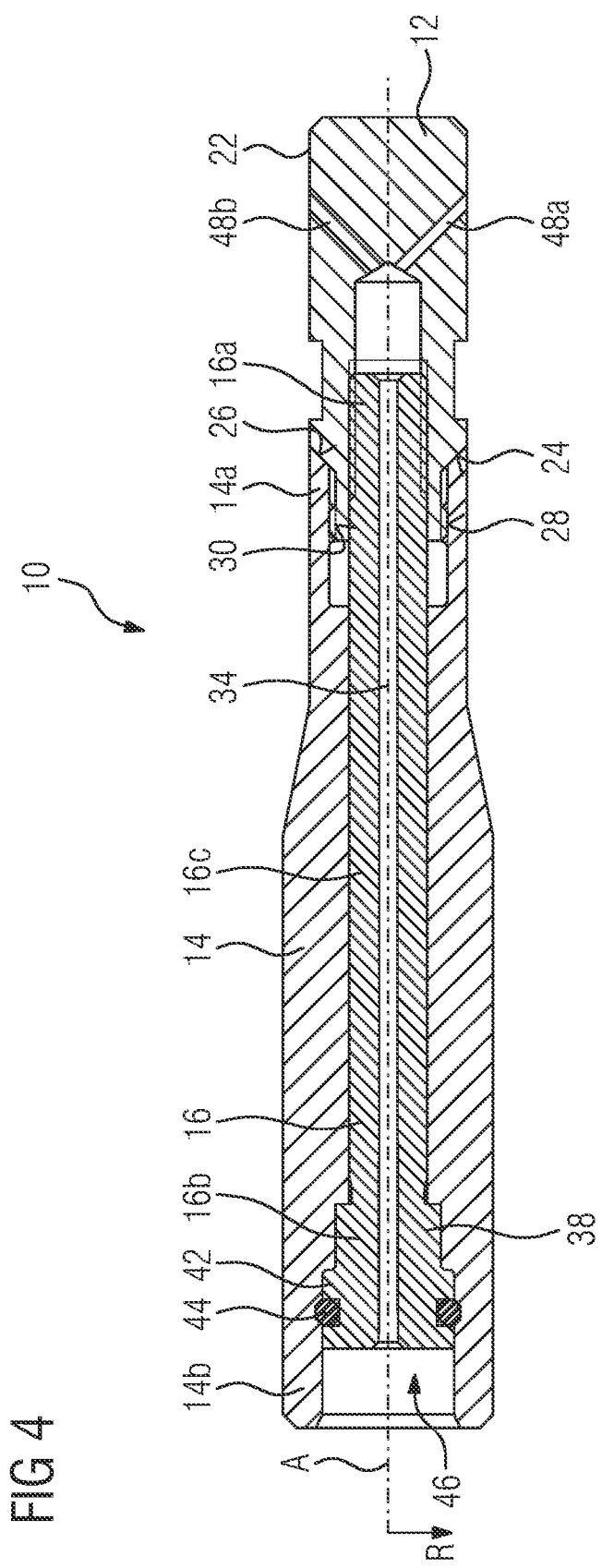
FIG. 4 shows a side view in sectional view of a tool according to the invention in assembled condition.

FIG. 3 and FIG. 4 show the tool 10 in a fully assembled state. Here, the tool 10 has an interface that allows the first and second holding elements 14, 16 and the machining head 12 to be connected to each other.

The front end portion 16a of the second holding element 16 has an external thread 32, so that the machining head 12 can be screwed onto the front end portion 16a. For this purpose, the machining head 12 is provided with a cavity 18 whose inner wall has an internal thread 20 corresponding to the external thread 32.

Externally, the machining head 12 has a working area 22 which may be formed in accordance with the tool type of the tool 10. For example, the machining head 12 can be provided as a milling head, as a reaming tool, as a twist drill, as a thread milling cutter, as a tapping tool or as a thread former and have a corresponding working area 22.

As shown in FIG. 2 and FIG. 3, the machining head 12 includes first and second interface surfaces 24, 28. The first holding element 14 has corresponding first and second interface surfaces 26, 30 that are aligned with and cooperate with the first and second interface surfaces 24, 28, respectively, during and after completion of the connection process, i.e., during bolting and in a tightly bolted condition of the machining head 12.

The respective first interface surfaces 24, 26 are designed as lateral surfaces of a truncated cone and are inclined towards the longitudinal tool axis A. If the machining head 12 is screwed onto the external thread 32, the interface surfaces 24, 26 slide on each other into a mutually concentric position due to their shape. As a result, during screwing on, the machining head 12 is drawn into a position concentric with the first holding element 14 and thus with the longitudinal axis A of the tool. Accordingly, the second holding element 16 is also drawn towards a position concentric to the tool axis A and is ideally arranged concentrically to this in the finished assembled state.

The respective second interface surfaces 28, 30 are radially opposite each other in the finished screwed state of the machining head 12 and are arranged concentrically to each other. The interface surface 28 of the machining head 12 supports the machining head 12 in the radial direction R on the interface surface 30 of the first holding element 14, in particular with respect to radial forces that arise on and in the machining head 12 during machining of a workpiece. The respective second interface surfaces 28, 30 are oriented parallel to the longitudinal tool axis A and are also aligned parallel thereto.

The machining head 12 also has an additional width across flats 36, to which the application of a tightening torque with a torque wrench is possible. Furthermore, the cavity 18 can be charged with cooling lubricant through a cooling lubricant channel 34, which can be fed into the working area 22 through corresponding channels.

It should be noted that the longitudinal axis of the holding element 14 defines the longitudinal tool axis A. The holding element 14 is intended for clamping in a chuck of a machine tool and is to be rotated by the machine tool. If the longitudinal axis of the holding element 14 deviates from an axis of rotation of the chuck, this results in an out-of-round run of the tool 10. Therefore, the first holding element 14 is manufactured with small positional and shape tolerances in order to achieve a high accuracy with respect to the longitudinal axis of the first holding element 14.

The second holding element 16, which is received within the first holding element 14, can be manufactured to relatively greater tolerances, since a position of the second holding element 16 within the first holding element 14 that is not fully coaxial may result in an imbalance of the tool 10, but this imbalance can be accommodated by a high strength or stiffness of the first holding element 14 without adversely affecting the runout characteristics of the tool 10.

This is one of the reasons why the first holding element is made of carbide and the second holding element is made of conventional tool steel, for example.

For connecting the first holding element 14 to the second holding element 16, the rear end region 16b of the second holding element 16 has a recess 40 in which an elastic fixing element 44, for example an O-ring, is accommodated. The rear end region 14b of the first holding element 14 has a corresponding recess, so that the second holding element 16 with the fixing element 44 can be inserted into the first holding element 14 until the fixing element 44 engages in the recess 40 and the recess of the first holding element 14, which are then opposite each other and thus define the assembled position of the first holding element 14 relative to the second holding element 16. In this manner, the second holding element 16 is secured within the first holding element 14 to prevent it from falling out.

The rear end portion 16b also has a shaped element as a tightening force receiving element 42, which can cooperate with a corresponding shaped element of the inner wall of the passage 14d and fix the second holding element 16 in its axial position against the tightening force during the screwing-in operation of the machining head 12, in the manner of a screw head.

The rear end regions 14b, 16b of first and second holding elements 14, 16 thereby form a cooling lubricant inlet 46, which is designed for coupling with a cooling lubricant supply and in particular for supply with a minimum quantity lubrication. Corresponding cooling lubricant channels 48a, b of the machining head 12 are provided.

Figure 5:
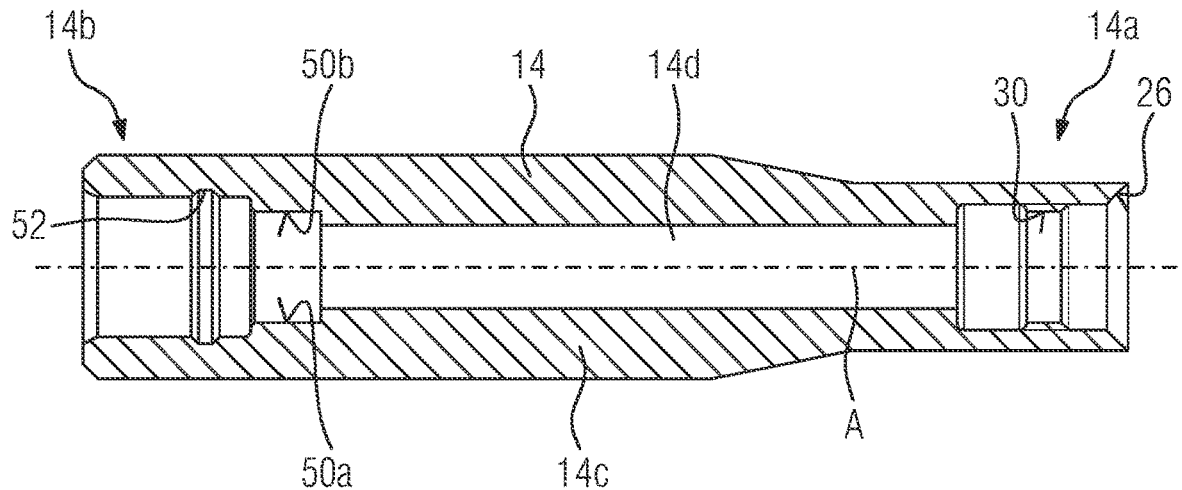
FIG. 5 shows a side view in sectional view of a first holding element for a tool according to the invention.

FIG. 5 shows a sectional view of a first holding element 14 for a tool 10 according to the invention. It can be seen that the passage 14d has a constant diameter in the intermediate portion 14c, which widens in the front end region 14a and the rear end region 14b respectively.

In the front end region 14a, the first interface surface 26 formed as the lateral surface of a truncated cone can be seen, which is inclined at an angle of 45 degrees to the longitudinal axis A of the tool.

The second interface surface 30 is formed on an inner wall surface of the passage 14d in the front end portion 14a and projects in the radial direction toward the longitudinal tool axis A.

Torque receiving surfaces 50a, b are formed in the rear end portion 14b to form an anti-rotation means with corresponding elements of the second holding element 16. A circumferential recess 52 is formed in the wall of the passage 14d, in which the fixing element 44, in particular an O-ring, can engage and which is provided for cooperation with the recess 40 of the second holding element 16 and the fixing element 44.

Figure 6:
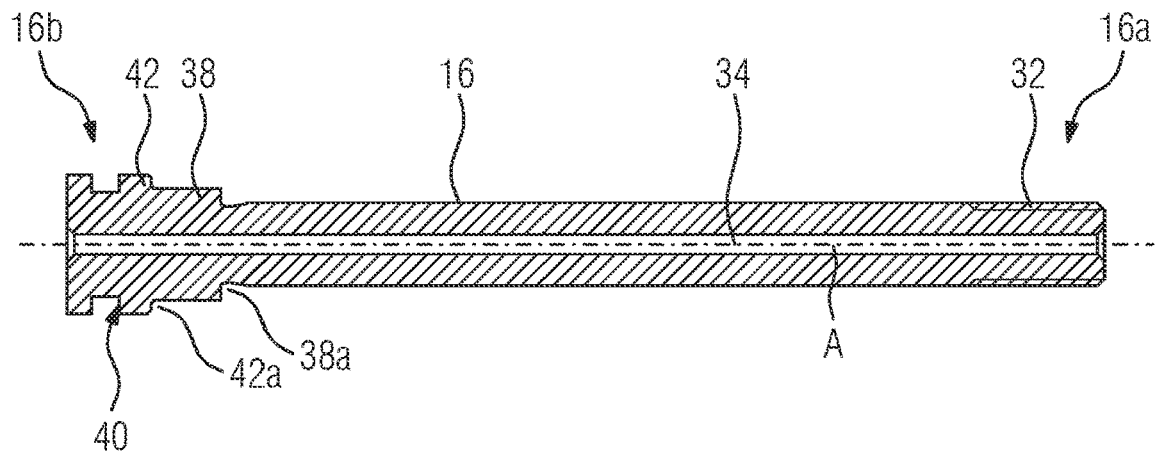
FIG. 6 shows a side view in sectional view of a second holding element for a tool according to the invention.

FIG. 6 shows a sectional view of a second holding element 16 for a tool 10 according to the invention. The second holding element 16 is designed as a threaded bolt and has an external thread 32 in the front end region 16a for screwing to the machining head 12.

In the rear end region 16b, the tightening force receiving element 42 is provided with a tightening force receiving surface 42a, which is formed as a radially projecting shaped element. Axially rearwardly offset from the tightening force receiving member 42 is formed the recess 40 in which the fixing member 44, or an O-ring, can engage. The torque receiving section 38 can optionally also be provided with a tightening force receiving surface 38a for action in the axial direction.

Figure 7:
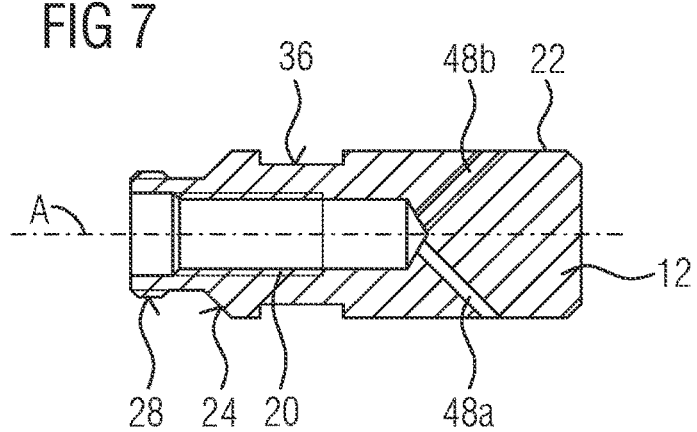
FIG. 7 shows a side view in sectional view of a machining head for a tool according to the invention.

FIG. 7 shows a sectional view of a machining head 12 for a tool 10 according to the invention. Internal cooling lubricant channels 48a, b extend in the machining head 12 and can be supplied with cooling lubricant from the cavity 18. As a result, the tool 10 is capable of minimal quantity lubrication.

In addition, the first and second interface surfaces 24, 28 of the machining head 12 are apparent, the second surface 24 also being inclined at an angle of 45 degrees with respect to the longitudinal tool axis A and thus corresponding to and cooperable with the interface surface 26 shown in FIG. 5 for force absorption in the axial and or radial directions. The internal thread 20 is disposed within the cavity 18 so that the machining head 12 can be threaded to the external thread 32 in a simple manner.

LIST OF REFERENCE SIGNS

10 Tool
12 Machining head
14 First holding element
14a Front end portion
14b Rear end portion
14c Intermediate portion
14d Passage
16 Second holding element
16a Front end portion
16b Rear end portion
16c Intermediate portion
18 Cavity
20 Internal thread
22 Working area
24 First interface surface of the machining head
26 First interface surface of the first holding element 14
28 Second interface surface of the machining head
30 Second interface surface of the first holding element 14
32 External thread
34 Coolant/lubricant channel
36 Width across flats
38 Torque receiving section
38a Tightening force absorption surface
40 Recess
42 Tightening force receiving element
42a Tightening force absorption surface
44 Fixing element
46 Coolant/Lubricant Inlet
48a,b Coolant/lubricant channel
50a, b Torque receiving surfaces
52 Recess
54 Recess A Tool longitudinal axis
E Screw-in direction
S Working direction of rotation
R Radial direction

We claim:

1. A multi-part modular tool rotatable about a longitudinal tool axis (A), comprising:
a one-piece machining head;
a first holding element comprising a body elongated along the longitudinal tool axis (A), in which a passage extends along the longitudinal tool axis (A);
a second holding element which can extend or extends at least in sections in the passage of the first holding element;
wherein:
the machining head can be connected or is connected to the second holding element in such a way that the machining head is firmly fixed to the first holding element at least in the axial direction (A) and/or in the radial direction (R), and wherein the passage of the first holding element and the second holding element are adapted to one another in such a way that during a connection process in which the machining head is connected to the second holding element, the second holding element is movable or is moved relative to the first holding element,
the machining head has a cavity provided to receive a front end portion of the second holding element and wherein the machining head has an internal thread disposed within the cavity which is screwable or threaded onto an external thread provided at the front end portion,
an interface surface of the machining head and an interface surface of the front end region cooperate in such a way that the machining head is supported radially on the front end region, and wherein the interface surface of the machining head is an outer surface of the machining head and is disposed in the passage of the first holding element, and
the interface surface of the front end portion is an inner wall surface of the passage, and wherein the interface surface of the machining head is disposed between the inner wall surface and the second holding element.

2. The tool of claim 1, wherein:
the first holding member has a front end portion and a rear end portion disposed opposite to the front end portion, and wherein the second holding member has a front end portion and a rear end portion disposed opposite to the front end portion, and the rear end portion of the second holding element is receivable or received within the rear end portion of the first holding element; and/or
the front end portion of the second holding element extends in or through the front end portion of the first holding element, and projects beyond it in the axial direction (A).

3. The tool according to claim 1, wherein:
the rear end portion of the second holding element is substantially fixed relative to the rear end portion of the first holding element during a connecting operation in which the machining head is connected to the second holding element in at least one axial direction (A), and/or
the front end portion of the second holding element is movable or is moved relative to the front end portion of the first holding element during a connection process in which the machining head is connected to the second holding element in the radial direction (R).

4. The tool according to claim 1, wherein:
the rear end portion of the second holding element is secured or can be secured within the rear end portion of the first holding element by a fixing element, preferably an elastic fixing element in such a way that the rear end portion of the second holding element is arranged concentrically to the rear end portion of the first holding element, and/or
the front end portion of the second holding element extends in or through the front end portion of the first holding element so as to be able to move radially, relative to the front end portion of the first holding element during the connecting operation in which the machining head is connected to the second holding element.

5. The tool according to claim 2, wherein:
the front end portion of the second holding element is arranged substantially concentrically with the front end portion of the first holding element when the machining head is connected to the second holding element, after the end of the connection process, in such a way that the machining head is firmly fixed to the first holding element.

6. The tool according to claim 2, wherein:
the front end portion of the second holding element is spaced from the front end portion of the first holding element such that a circumferential gap is provided between the front end portion of the second holding element and the front end portion of the first holding element.

7. The tool according to claim 1, wherein:
the machining head has a further interface surface and wherein a front end portion of the first holding element has a further interface surface,
the further interface surface of the machining head cooperates with the further interface surface of the front end portion during a connecting operation in which the machining head is connected to the second holding member, such that the machining head is moved in a self-centering manner into a concentric position with the first holding member.

8. The tool according to claim 7, wherein:
the further interface surface of the machining head and the further interface surface of the front end region are formed as lateral surfaces of a truncated cone in such a way that the further interface surface of the machining head and/or the further interface surface of the front end region are inclined at an angle in the range from 30° to 60° to the longitudinal axis (A) of the tool.

9. The tool according to claim 2, wherein:
the rear end region of the second holding element and/or the rear end region of the first holding element has or have an anti-rotation device which prevents rotation of the first holding element relative to the second holding element in at least one screw-in direction (E), preferably in both directions of rotation (E, S) of the tool,
the rear end region of the first holding element and the rear end region of the second holding element have at least one or more surfaces acting positively against one another, and
the anti-rotation device comprises positively acting surfaces on the rear end region and/or the rear end region, which prevents rotation of the first holding element relative to the second holding element.

10. The tool according to claim 1, wherein:
the first holding element comprises a hard metal material, or comprises a heavy metal, or comprises a steel, and/or the second holding element comprises a material which is free of hard metal, preferably a tool steel or a high-speed steel, and/or the machining head comprises a hard metal material, wherein the machining head has a sintered thread, preferably an internal thread arranged within a cavity of the machining head and sintered on or with the machining head.

11. The tool according to claim 1, wherein:
the machining head can be a milling head, a reaming tool, a twist drill head, a thread milling head, a tapping head or a thread former.

12. The tool according to claim 1, wherein the multi-part modular tool is a three-part modular tool.

13. The tool according to claim 1, wherein the second interface surface of the machining head and the interface surface of the front end region of the second holding element are oriented parallel to the longitudinal tool axis A.

14. A three-part modular tool rotatable about a longitudinal tool axis (A), comprising:
a machining head;
a first holding element comprising a body elongated along the longitudinal tool axis (A), in which a passage extends along the longitudinal tool axis (A); and
a second holding element which can extend or extends at least in sections in the passage of the first holding element;
wherein:
the machining head can be connected or is connected to the second holding element in such a way that the machining head is firmly fixed to the first holding element at least in the axial direction (A) and/or in the radial direction (R), and wherein the passage of the first holding element and the second holding element are adapted to one another in such a way that during a connection process in which the machining head is connected to the second holding element, the second holding element is movable or is moved relative to the first holding element,
the machining head has a cavity provided to receive a front end portion of the second holding element and wherein the machining head has an internal thread disposed within the cavity which is screwable or threaded onto an external thread provided at the front end portion,
an interface surface of the machining head and an interface surface of the front end region cooperate in such a way that the machining head is supported radially on the front end region, and wherein the interface surface of the machining head is an outer surface of the machining head and is disposed in the passage of the first holding element, and
the interface surface of the front end portion is an inner wall surface of the passage, and wherein the interface surface of the machining head is disposed between the inner wall surface and the second holding element.

15. The three-part modular tool according to claim 14, wherein the machining head is a one-part machining head.

16. The tool according to claim 14, wherein the interface surface of the machining head and the interface surface of the front end region of the second holding element are oriented parallel to the longitudinal tool axis A.

17. The tool according to claim 14, wherein:
the machining head has a further interface surface and wherein a front end portion of the first holding element has a further interface surface, the further interface surface of the machining head cooperates with the further interface surface of the front end portion during a connecting operation in which the machining head is connected to the second holding member, such that the machining head is moved in a self-centering manner into a concentric position with the first holding member.

18. The tool according to claim 17, wherein:
the further interface surface of the machining head and the further interface surface of the front end region are formed as lateral surfaces of a truncated cone in such a way that the further interface surface of the machining head and/or the further interface surface of the front end region are inclined at an angle in the range from 30° to 60° to the longitudinal axis (A) of the tool.

19. A multi-part modular tool rotatable about a longitudinal tool axis (A), comprising:
a machining head;
a first holding element comprising a body elongated along the longitudinal tool axis (A), in which a passage extends along the longitudinal tool axis (A);
a second holding element which can extend or extends at least in sections in the passage of the first holding element;
wherein:
the machining head can be connected or is connected to the second holding element in such a way that the machining head is firmly fixed to the first holding element at least in the axial direction (A) and/or in the radial direction (R), and wherein the passage of the first holding element and the second holding element are adapted to one another in such a way that during a connection process in which the machining head is connected to the second holding element, the second holding element is movable or is moved relative to the first holding element,
the machining head has a cavity provided to receive a front end portion of the second holding element and wherein the machining head has an internal thread disposed within the cavity which is screwable or threaded onto an external thread provided at the front end portion,
an interface surface of the machining head and an interface surface of the front end region cooperate in such a way that the machining head is supported radially on the front end region, and wherein the interface surface of the machining head is an outer surface of the machining head and is disposed in the passage of the first holding element, and
the interface surface of the front end portion is an inner wall surface of the passage, and wherein the interface surface of the machining head is disposed between the inner wall surface and the second holding element, the machining head has a further interface surface and wherein a front end portion of the first holding element has a further interface surface,
the further interface surface of the machining head cooperates with the further interface surface of the front end portion during a connecting operation in which the machining head is connected to the second holding member, such that the machining head is moved in a self-centering manner into a concentric position with the first holding member,
the further interface surface of the machining head and the further interface surface of the front end region are formed as lateral surfaces of a truncated cone in such a way that the further interface surface of the machining head and/or the further interface surface of the front end region are inclined at an angle in the range from 30° to 60° to the longitudinal axis (A) of the tool.

\* \* \* \* \*